Sept. 14, 1954

E. O. JOHNSON ET AL 2,689,325

INVERTER CIRCUIT

Filed Oct. 31, 1952

INVENTOR.
EDWARD O. JOHNSON &
WILLIAM M. WEBSTER, JR.

BY Morris Rabin

ATTORNEY

Patented Sept. 14, 1954

2,689,325

UNITED STATES PATENT OFFICE 2,689,325

INVERTER CIRCUIT

Edward O. Johnson and William M. Webster, Jr., Princeton, N. J., assignors to Radio Corporation of America, a corporation of Delaware Application October 31, 1952, Serial No. 317,964

7 Claims. (Cl. 321—35)

This invention relates to inverter circuits of the type used to convert D.-C. electrical energy into A.-C. electrical energy, and more particularly to a novel inverter circuit employing gaseous electron tubes. While not specifically related thereto, the inverter circuit of the present invention is particularly applicable for efficiently converting the low D.-C. voltage supplies in automobiles, airplanes, tanks and the like, into relatively high A.-C. voltages.

The main source of D.-C. voltage in automobiles, airplanes and tanks is a battery having a voltage output range from about 6 volts to about 28 volts. It is often necessary to convert this relatively low unidirectional voltage into an alternating voltage in order to operate certain types of equipment requiring an A.-C. voltage input, as for instance 110 volts A.-C. Inverter circuits employing thyratron tubes have been used to obtain the desired conversion of A.-C. power to D.-C. power. An objection, however, to the use of thyratron tube inverter circuits is the fact that the efficiency of the circuits is relatively low because of the power loss in the voltage drop across the thyratron tubes when they are conducting.

If a thyratron inverter circuit is used to convert a unidirectional voltage of 28 volts into an A.-C. voltage, it can be shown that the maximum tube efficiency will be $$100\left(1 - \frac{10}{28}\right) = 64 \text{ percent}$$

where the arc drop across the thyratron tube is 10 volts. In a copending application of one of the present co-inventors, E. O. Johnson, Serial No. 185,745, filed September 20, 1950, and assigned to the assignee of the present invention, there is described and claimed a gaseous electron tube in which the function of supplying energy to provide a space charge neutralizing plasma and the function of providing a field to draw work current are separated. Since the arc drop across the latter gaseous tube is in the neighborhood of two volts when it is conducting, it can be shown that the maximum efficiency of this type of tube will be $$10\left(1 - \frac{2}{28}\right) = 93 \text{ percent}$$

It is, therefore, evident that the efficiency of the inverter circuit is approximately inversely proportional to the voltage drop across the tube while it is conducting, other things being equal.

While the dual function gas tube of the type described acts as a highly efficient inverter because of its low tube arc drop, conventional inverter circuits for its employment have not been found satisfactory. Since two electrodes of this gas tube; namely, the grid of the constricting electrode control conduction, as used herein, both of these electrodes should have a signal applied to them. These signals may come from an external driving source or they may be obtained from a feed back arrangement. When the latter method is used, it has been found that there is a tendency for the inverter to operate at a frequency of its own choice rather than at the frequency of the driving signal. There are two objections, however, to driving both the grid and the constricting electrode of the gas tube by driving signals. Firstly, the driving power that is usually required may be more than that conveniently obtainable from conventionally available frequency standards. Secondly, sinusoidal wave shapes are at best a poor approximation to the desired driving signals.

It is, therefore, an important object of the present invention to provide a novel and highly efficient inverter circuit employing gas tubes of the type described, which will overcome the above described objections.

It is a further object of the present invention to provide an improved inverter circuit, employing gas tubes of the type described, adapted to convert relatively low unidirectional voltages efficiently into higher A.-C. voltages.

Still a further object of the present invention is to provide a novel inverter circuit, employing gas tubes of the type described connected in a parallel-type circuit, which is simple and positive in operation and highly efficient in use.

These and further objects of the present invention are attained in a novel parallel-type inverter circuit, employing gaseous discharge tubes of the type described wherein the working function and the ionization function are separated. A pair of gaseous tubes each having an anode, a grid, a main cathode, an auxiliary cathode, and a garrote or constricting electrode are connected in a parallel-type inverter circuit. The source of unidirectional voltage, to be converted into a source of A.-C. voltage is connected in the anode-main cathode circuit of each tube. The anodes of each tube are coupled to an output transformer. A second source of unidirectional voltage is connected in the auxiliary cathode-main cathode circuit of each tube. An individual voltage divider circuit associated with each of the tubes, respectively, is provided to bias the grids of the tube. A driving signal is applied to the constricting electrodes in order to fire the gas tubes alternately, that is, in a cyclical order. A positive signal applied to the constricting electrode will cause an ionization discharge within the tube and current will flow in the auxiliary cathode-main cathode circuit. As a result of the ionization discharge, the voltage at the auxiliary cathode will approach that of the main cathode and, consequently, place a positive-going voltage on the grid. The positive-going grid will now permit current to flow in the anode-main cathode circuit of the tube. Since the arc drop across the anode and main cathode of the tube, when it is conducting, is in the order of only one or two volts, this section of the tube acts as a current amplifier by means of which more than 90 percent of the unidirectional voltage is converted ino an A.-C. voltage at the output transformer.

By providing grid bias for the tubes in accordance with the voltage divider arrangement of the present invention, a signal of proper shape is applied to the grid. This arrangement for obtaining grid bias also insures perfect syncronization between the ionization discharge and the grid drive, with the result that the tube is fired substantially instantaneously. The firing of one tube causes the other tube to become extinguished. The wave forms, produced by current flowing through each of the tubes are combined in the output transformer to produce a sine wave of good characteristics. The novel features of the invention, as well as the invention itself, both as to its organization and method of operation will be understood in detail by the following description when considered in connection with the accompanying drawing in which:

Figure 1:
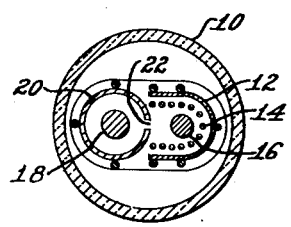
Fig. 1 is a cross-sectional view of a gaseous electron tube as used in the inverter circuit, in accordance with the present invention.

Referring now to Fig. 1, there is shown a cross-sectional view of a gas tube utilized in the present invention. A tube envelope 10 contains a U-shaped anode 12 of sheet metal which is disposed externally to and in juxtaposed position with a control grid 14 having relatively coarse spacing. A main cathode 16 is maintained within and partially surrounded by the control grid 14 of the anode 12. An auxiliary cathode 18, laterally spaced from the main cathode 16, is maintained coaxially with respect to a slotted cylindrical restricting electrode, or garrote 20. An elongated, narrow slot 22 in the constricting electrode 20 extends along a plane through the axes of the auxiliary and main cathodes. This structure permits the desired degree of ionization to be obtained between the auxiliary and main cathodes with a considerable minimization of power required to sustain ionization within the tube. The anode 12 and the main cathode 16 of the tube provide the load circuit through which load currents can be passed in the manner of conventional tubes. These load currents may be controlled by the potential applied to the control grid 14. The auxiliary cathode 18 is an additional electrode for cooperation with the anode 12 and/or the main cathode 16 to provide for the ionization of the gas in the tube. The envelope 10 is filled with an ionizable gas, such as helium.

This gaseous electron tube is completely shown, described and claimed in the copending application by E. O. Johnson. Ionization or breakdown of the gas occurs between the auxiliary cathode and the main cathode and/or the anode of the tube. There is thus provided within the gas envelope a plasma which acts as an excellent conductor and which provides a low resistance connection between the anode and the main cathode of the tube. The density of the plasma generated in the tube is controlled at least in part by the amount of current flowing through the ionization circuit. Accordingly, the effective resistance between the main cathode 16 and the anode 12 may be controlled effectively by controlling the current flow in the ionization circuit. Alternately, the load current may be controlled by the potential applied to the control grid 14 interposed between the main cathode and the anode. The characteristics of the type of gaseous tube utilized are such that a relatively small change in the ionization current is effective to produce a relatively large change in the load circuit.

Figure 2:
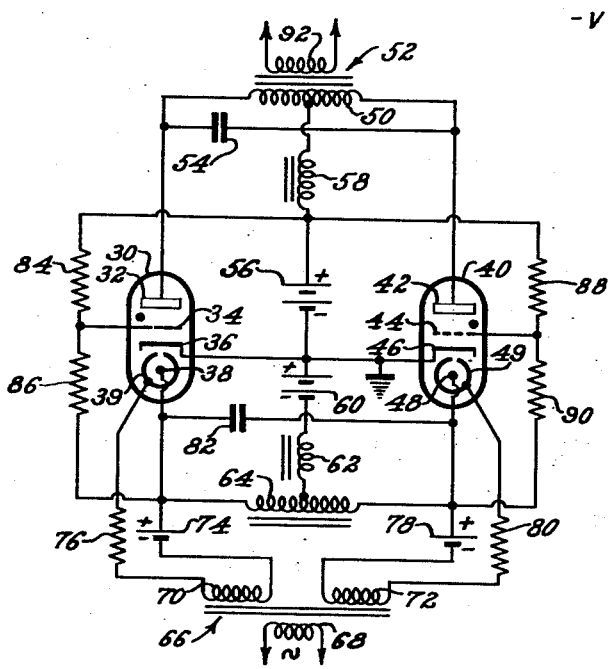
Fig. 2 is a circuit diagram of an inverter circuit in accordance with the present invention.

Referring now to Fig. 2, there is shown a parallel-type inverter circuit in accordance with the present invention employing a pair of gaseous tubes 30 and 40 of the type described. Each of the tubes 30 and 40 has, respectively, an anode 32 and 42, a grid 34 and 44, a main cathode 36 and 46, an auxiliary cathode 38 and 48 and a constricting electrode 39 and 49. The anodes 32 and 42 of the tubes 30 and 40 are connected to each other through the primary winding 50 of an output transformer 52. The anodes 32 and 42 are also connected to each other through a commutating capacitor 54. The main cathodes 36 and 46 of the tubes 30 and 40 are connected to each other and to a source of reference potential, such as ground. A source of unidirectional voltage 56, which is to be converted into an A.-C. voltage, has its negative terminal connected to the main cathodes 36 and 46 of the tubes 30 and 40, and its positive terminal connected to a center tap on the primary winding 50 of the transformer 52 through a smoothing choke 58. A second source of unidirectional voltage 60 is provided for the auxiliary cathode-main cathode circuit of each of the tubes 30 and 40. The positive terminal of the unidirectional voltage source 60 is connected to the main cathodes 36, and 46 of the tubes 30 and 40 and the negative terminal is connected to the auxiliary cathodes 38 and 48 of the tubes 30 and 40 through a smoothing choke 62 and a center-tapped impedance, or choke 64. It is possible to omit the choke 62 without seriously affecting the operation of the circuit. Also, the choke 64 may be replaced with a center-tapped resistor.

Means are provided to fire the tubes 30 and 40 alternately. To this end, there is provided an input transformer 66 having a primary winding 68 adapted to be connected across any convenient and conventional source of alternating voltage (not shown). The input transformer 66 is provided with two secondary windings 70, 72. The secondary winding 70 is connected, in the auxiliary cathode-constricting electrode circuit of the tube 30, in series with the auxiliary cathode 38, a bias voltage source 74, a current limiting resistor 76, and the constricting electrode 39. In a similar manner, the secondary winding 72 of the input transformer 66 is connected, in the auxiliary cathode-constricting electrode circuit of the tube 40, in series with the auxiliary cathode 48, a bias voltage source 78, a current limiting resistor 80, and the constricting electrode 49. The bias supplied by the bias batteries 74 and 78 may also be obtained by the usual cathode self-bias arrangement that is normally used with vacuum tubes. The auxiliary cathodes 38 and 48 of the tubes 30 and 40 are connected to each other through a commutating capacitor 82.

In order to provide both a suitable bias on the grids 34 and 44 of the tubes 30 and 40 to hold off conduction when the tubes are not fired, and to provide a positive-going voltage to permit conduction when the tubes are triggered, a novel biasing circuit is provided. Each of the tubes 30 and 40 is provided with a separate voltage divider. To this end, a resistor 84 has one end connected to the positive terminal of the voltage source 56, and the other end connected to the auxiliary cathode 38 of the tube 30 through a resistor 86. The grid 34 of the tube 30 is connected to the junction between the resistors 84 and 86. A similar voltage divider is provided for the tube 40. A resistor 88 has one end connected to the positive terminal of the voltage source 56, and the other end connected to the auxiliary cathode 48 of the tube 40 through a resistor 90.

The operation of the parallel-type inverter circuit illustrated in Fig. 2 will now be described. Let it be assumed that the tube 40 is conducting current through its anode-main cathode circuit and its auxiliary cathode-main cathode circuit, and that the tube 30 is cut off. Let it be assumed further, that as a result of the alternating current applied to the primary 68 of the input transformer 66, a transformed positive-going voltage is applied to the constricting electrode 39 of the tube 30. The secondary windings 70, 72 of the input transformer 66 are wound in such a direction that a negative-going voltage will be applied to the constricting electrode 49 of the tube 40 when a voltage of opposite polarity is applied to the constricting electrode 39 of the tube 30. By this means, the tubes 30 and 40 are fired alternately. Because of the positive-going voltage applied to the constricting electrode 39 of the tube 30, an ionization discharge occurs between the auxiliary cathode 38 and the main cathode 36 whereby current will flow in the auxiliary cathode-main cathode circuit of the tube 30. As a result of the ionization discharge, the auxiliary cathode 38 will become less negative and approach the reference potential on the main cathode 36. This less negative voltage, or positive-going voltage, is applied to the auxiliary cathode 48 of the tube 40 through the commutating capacitor 82, and, consequently, the ionization discharge through the tube 40 is extinguished. The negative-going constricting electrode 49 of the tube 40 also aids in extinguishing the ionization discharge in the tube 40. As a result of the positive-going voltage on the auxiliary cathode 38, resulting from the ionization discharge in the tube 30, the grid 34 also goes positive and causes current to flow in the anode-main cathode circuit of the tube 30. The voltage at the anode 32 now drops to about one or two volts above that of the reference potential on the main cathode 36. This latter drop of voltage is applied to the anode 42 of the tube 40 through the commutating capacitor 54, and acts to cut off conduction through the tube 40.

It is noted that if the grid 34 is connected to a suitable point on the voltage divider formed by the resistors 84, 86, the voltage applied to the grid 34 is sufficiently negative to hold off conduction through the anode-main cathode circuit when the tube 30 is cut off, and sufficiently positive to permit conduction when the tube 30 is triggered.

Current will flow through the tube 30 until the tube 40 is triggered by the voltage across the secondary winding 72. At this time, a positive-going voltage will be applied to the constricting electrode 49 of the tube 40 and an ionization discharge will result in the auxiliary cathode-main cathode circuit of the tube 40. The tube 40 will now go through the same chain of events as described for the tube 30. If the tubes 30 and 40 were ordinary thyratrons, the voltage drop across the anode and main cathode during the conduction period would be in the order of about 10 volts. By providing circuitry in accordance with the present invention, whereby an ionization discharge is produced between the auxiliary and main cathodes, the voltage drop across the tubes 30, 40 is in the order of only one or two volts. Since the efficiency of an inverter circuit is approximately inversely proportional to the voltage drop across the gaseous tubes, it is evident that the circuit in accordance with the present invention is considerably more efficient than conventional thyratron inverter circuits. This is especially true where the unidirectional voltage source, such as the voltage source 56, is a relatively low voltage.

A further understanding of the present invention may be had by referring to Figs. 3A to G wherein there are shown wave forms of voltage and current in connection with the various elements of the tube. All of the voltages are referred to the main cathodes as zero. In these wave forms, the solid line refers to the characteristics of one tube, for example tube 30, and the dashed line refers to the characteristics of the other tube, the tube 40. The wave forms illustrated in the Figs. 3A to G are those for an inverter system in accordance with the present invention wherein the voltage source 56 is about 28 volts, the voltage source 60 is about 100 volts and the voltage sources 74, 78 are each about 2 volts.

Figure 3:
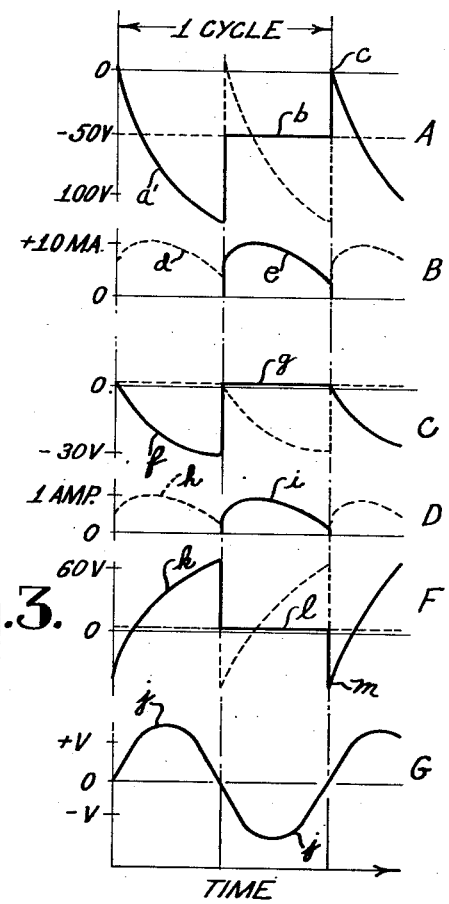
Figs. 3A to G are graphs used to explain the operation of the inverter circuit of Fig. 2.

Referring now to Fig. 3A, the solid line curve represents the voltage on the auxiliary cathode with respect to time. The portion a' of the curve represents the voltage on the auxiliary cathode after the tube has been cut off. During this first half cycle as represented by the portion a' of the curve, the voltage of the auxiliary cathode is recovering from substantially zero voltage to a voltage determined by the circuit parameters comprising the capacitor 82, the choke 62 and the choke 64. During the second half cycle, the tube 30 is triggered as when the constricting electrode 39 goes positive. At this time, the voltage of the auxiliary cathode 38 drops to a constant value as represented by the portion of the curve b. When the tube 30 is cut off by the positive-going voltage applied to the auxiliary cathode 38 from the positive-going auxiliary cathode 48, transmitted to the auxiliary cathode 38 through the commutating capacitor 82, the voltage on the auxiliary cathode 38 rises to the point c, and the tube 30 is cut off. It is noted that the voltage at the auxiliary cathode 48 of the tube 40, with respect to its main cathode 46, undergoes the same series of events as described, except that the voltage at the auxiliary cathode 48 is 180° out of phase with that at the auxiliary cathode 38. In Fig. 3B there is shown the current flowing in the auxiliary cathode-main cathode circuit as a result of the ionization discharge. The dashed curve *d* of Fig. 3B illustrates the magnitude of the ionization discharge current during the first half cycle, as when the tube 40 is conducting. The solid curve *e* of Fig. 3B illustrates the variations of the magnitude of the current of the auxiliary discharge current with time during the second half of the first cycle.

Referring now to Fig. 3C, there is shown by the solid line curve the voltage on the grid 34 of the tube 30. During the first half cycle, when the tube 30 is not conducting it is noted that the voltage decreases from a slightly positive value to a substantially negative value as illustrated by the portion *f* of the curve. When the tube 30 is fired, the voltage on the grid rises suddenly to a slightly positive value as illustrated by the portion *g* of the curve. It is noted that the voltage on the grid of the tube follows the voltage on the auxiliary cathode of the tube. This is to be expected since the voltage divider to which the grid is connected is also connected to the auxiliary cathode. In Fig. 3C, it is again noted that the voltage on the grid 44 of the tube 40 as represented by the dashed line is 180° out of phase with that of the voltage on the grid 34 of the tube 30.

The current flowing in the anode-main cathode circuit of the tube 40 is represented by the dashed curve *h* of the Fig. 3D. It is noted that the current flowing in the anode-main cathode of the tube is roughly 100 times greater than the current flowing in the auxiliary cathode-main cathode circuit. Thus, it is seen that in accordance with the circuit of the present invention, each gas tube acts as two thyratrons; one to provide an auxiliary discharge, and the other to handle the work load. It is also noted that under these circumstances the portion of the gas tube handling the work load acts as a current amplifier whereby it is possible to convert substantially all of the power from the unidirectional source 56 into an A.-C. voltage output. In Fig. 3D, the solid line *i* represents the magnitude of the current with respect to time during the second half of the cycle in the tube 30. As a result of the current, represented by the curves *h* and *i* of Fig. 3D, the voltage waves induced in the primary winding 50 of the transformer 52 are combined and appear across the secondary winding 92 of the transformer 52 as a sine wave of good characteristics as illustrated by the curve *j* in Fig. 3G.

Referring now to Fig. 3F, there is shown by the solid line the voltage at the anode 32 of the tube 30. During the portion *k* of the curve the tube 30 is cut off and the voltage at the anode 32 is rising in accordance with the circuit parameter comprising the capacitor 54, the smoothing choke 58, and the reflected load impedance of the primary winding 50 of the output transformer 52. It is noted that the peak value of the anode voltage may exceed and even double the voltage at the source 56. Under these conditions, the negative-going voltage on the grid 34 of the tube 30 is necessary to prevent breakdown, that is hold off conduction across the anode-main cathode path of the tube. When the tube 30 is fired, the voltage at the anode drops to about one or two volts above the reference potential, as shown in the portion *l* of the curve. At the beginning of the third half cycle, when the tube 40 begins to conduct, the voltage at the anode 32 is depressed to the point *m* by means of a voltage applied to the anode 32 from the negative-going voltage of the anode 42 through the commutating capacitor 54.

In accordance with the objects of the present invention, there has been shown and described above, a novel, useful, and highly efficient inverter system using circuitry adapted to employ gas tubes of the type described in order to provide a high current, low impedance output. In accordance with the present invention a triggering signal is applied alternately to the constricting electrodes of the tubes to fire them alternately. Bias means for the grid of each tube is provided by means of a voltage divider connected between the positive terminal of the voltage source to be inverted and the auxiliary cathode of each tube. In this manner, the voltage on the grid of each tube is synchronized with the driving signal so that perfect synchronization between the ionization discharge and the grid drive for the anode-main cathode circuit of the tube is insured.

What is claimed is:

1. Apparatus for converting D.-C. energy into A.-C. energy comprising a pair of gas tubes each having an anode, a grid, a main cathode, an auxiliary cathode, and a constricting electrode, output means coupled to said anodes, means to apply a first source of unidirectional voltage between said anodes and said main cathodes, means to apply a second source of unidirectional voltage between said main cathodes and said auxiliary cathodes, means connected between the auxiliary cathode and the constricting electrode of each of said tubes to fire said tubes alternately, a capacitor connected between said auxiliary cathodes, and grid bias means for the grid of each of said tubes comprising a pair of voltage dividers each connected in series with said first and second sources, and means connecting each of said grids to a point on a separate one of said voltage dividers respectively.

2. Apparatus for converting D.-C. energy into A.-C. energy comprising a pair of gas tubes each having an anode, a grid, a main cathode, an auxiliary cathode, and a constricting electrode surrounding a portion of said auxiliary electrode, output means coupled to said anodes, an anode-main cathode circuit for each of said tubes, means to apply a first source of unidirectional voltage in each of said circuits, means to apply a second source of unidirectional voltage between said main cathodes and said auxiliary cathodes, a capacitor connected between said auxiliary cathodes, A.-C. input means coupled between the constricting electrode and the auxiliary cathode in each of said tubes to fire each tube alternately with respect to the other, a pair of voltage dividers each connected in series with said first and second sources, and each of said grids being connected to an intermediate point on a separate one of said voltage dividers respectively.

3. Apparatus for converting D.-C. energy into A.-C. energy comprising a first and a second gas tube each having an anode, a grid, a main cathode, an auxiliary cathode, and a constricting electrode surrounding a portion of said auxiliary cathode, an output transformer having a center-tapped primary winding connected in series with said anodes, a first source of unidirectional potential having a positive terminal connected to the center tap of said primary winding and a negative terminal connected to said main cathodes, a second source of unidirectional voltage connected between said main cathodes and said auxiliary cathodes, means to trigger each of said tubes alternately connected between said constricting electrode and said auxiliary cathode, a capacitor connected between said auxiliary cathodes, a pair of similar voltage dividers each associated with one of said tubes and connected between said positive terminal and a separate one of said auxiliary cathodes, and an intermediate point on each of said dividers being connected to the grid of its associated tube.

4. An inverter comprising a first and a second gas tube each having an anode-main cathode circuit and an auxiliary cathode-main cathode circuit, means to apply a first and a second source of unidirectional voltage in common with said anode-main cathode circuits and said auxiliary cathode-main cathode circuits respectively, a grid and a constricting electrode in each of said tubes, means to cause current to flow alternately in the auxiliary cathode-main cathode circuits of said tubes, grid bias means comprising a separate voltage divider for each of said tubes, each of said voltage dividers being connected between a connection in common with each of said anode-main cathode circuits and a separate similar connection in each of said auxiliary cathode-main cathode circuits.

5. A parallel-type inverter comprising a first and a second gas tube each having an anode, a grid, a main cathode, an auxiliary cathode, and a constricting electrode surrounding a portion of said auxiliary cathode, an output transformer having a center-tapped primary winding connected between said anodes, a first capacitor connected between said anodes, means to connect a first source of unidirectional voltage between the center tap of said primary winding and said main cathodes, a center-tapped impedance connected between said auxiliary cathodes, means to apply a second source of unidirectional voltage between said main cathodes and the center tap of said impedance, a second capacitor connected between said auxiliary cathodes, a voltage divider associated with each of said tubes, each of said dividers having one end connected to said first source, another end connected to the auxiliary cathode of its associated tube, and an intermediate point connected to the grid of its associated tube, and means coupled between the auxiliary cathode and constricting electrode in each of said tubes to fire said tubes alternately.

6. In apparatus of the type used to convert A.-C. energy into D.-C. energy and having a first and a second gas tube, each of said tubes having an anode-main cathode circuit and an auxiliary cathode-main cathode circuit; the improvement comprising a constricting electrode-auxiliary cathode circuit for each of said tubes, A.-C. means coupled to said constricting electrode-auxiliary cathode circuits to fire said tubes alternately, a capacitor coupled between said constricting electrode-auxiliary cathode circuits, and a separate bias means for each of said tubes, each of said bias means comprising a voltage divider connected between the anode-main cathode circuit and the auxiliary cathode-main cathode circuit of its associated tube.

7. In apparatus of the type used to convert A.-C. energy into D.-C. energy and having a first and a second gas tube, each of said tubes having an anode, a grid, and a main cathode, output means coupled to said anodes, and means to apply a first source of unidirectional voltage between said anode and main cathode in each tube; the improvement comprising an auxiliary cathode and a constricting electrode in each of said tubes, means to apply a second source of unidirectional voltage between the main cathode and auxiliary cathode of each of said tubes, a capacitor connected between the auxiliary cathodes of each of said tubes, an input transformer having two secondary windings, each of said windings being in circuit with the auxiliary cathode and the constricting electrode of each of said tubes respectively, a separate voltage divider associated with each tube and connected between said first voltage source and the auxiliary cathode of its associated tube, and intermediate point on each of said dividers being connected to the grid of its associated tube.

References Cited in the file of this patent

UNITED STATES PATENTS

| Number | Name | Date |
| --- | --- | --- |
| 1,390,727 | Schenkel | Sept. 13, 1921 |
| 2,284,389 | Hansen | May 26, 1942 |
| 2,456,754 | Sziklai | Dec. 21, 1948 |
| 2,611,684 | Webster | Sept. 23, 1952 |